United States Patent

Koyamoto et al.

[11] Patent Number: 5,925,321
[45] Date of Patent: Jul. 20, 1999

[54] GARBAGE DISPOSING DEVICE

[75] Inventors: Masanori Koyamoto, Neyagawa; Harushige Tsusaka, Okazaki; Kaoru Yamashita; Kazumasa Rokushima, both of Katano; Junichi Ikeuchi, Osaka; Hiroyasu Kawanishi, Kashihara; Takashi Hyodo, Fukuoka; Hideo Fujimoto, Daito; Tomoaki Fujii; Yoshitoshi Kanetsuna, both of Hikone, all of Japan

[73] Assignee: Matsushita Electric Works, Ltd., Osaka, Japan

[21] Appl. No.: 08/964,754

[22] Filed: Nov. 5, 1997

[30] Foreign Application Priority Data

Feb. 25, 1997 [JP] Japan .................................. 9-040324
Apr. 21, 1997 [JP] Japan .................................. 9-103365

[51] Int. Cl.$^6$ .............................. A61L 9/00; A61L 11/00
[52] U.S. Cl. .................................. 422/122; 422/4; 422/5; 422/108; 422/109; 422/176; 422/177; 96/222; 55/463; 241/DIG. 38
[58] Field of Search .................................. 422/4, 5, 108, 422/109, 116, 120, 122, 307, 176, 177, 199; 96/222; 55/462, 463; 241/DIG. 38

[56] References Cited

U.S. PATENT DOCUMENTS

| 5,355,789 | 10/1994 | Suzuki et al. | 100/92 |
| 5,577,673 | 11/1996 | McMurphy et al. | 241/33 |
| 5,634,600 | 6/1997 | Kubota et al. | 241/36 |
| 5,687,918 | 11/1997 | Kubota et al. | 241/36 |

FOREIGN PATENT DOCUMENTS 2-30760  11/1990  Japan .

OTHER PUBLICATIONS

English translation of the Abstract of Japanese Publication No. 60–129196 Jul. 10, 1985.

Primary Examiner—Elizabeth McKane
Assistant Examiner—Fariborz Moazzam
Attorney, Agent, or Firm—Nikaido, Marmelstein, Murray & Oram LLP

[57] ABSTRACT

A garbage disposing device of an energy-saving type comprises a housing having an air intake port and an air discharge port, and a vessel mounted within the housing to store therein food wastes. The vessel has an air inlet and an air outlet. An intake passage is formed in the housing to extend from the intake port to the air inlet for introducing a fresh air into the vessel. An exhaust passage is formed within the housing to extend from the air outlet to the discharge port for discharging therethrough an air containing unpleasant odor resulting from a decomposition of the food wastes. A deodorizer unit comprises a catalyst for decomposing the unpleasant odor in the air, a heater for activating the catalyst, and a case for incorporating therein the catalyst and the heater. In the present invention, the deodorizer unit is mounted in the exhaust passage such that an outer surface of the case is exposed in the intake passage, and the fresh air in the intake passage is warmed by a contact with the outer surface of the case inevitably heated by the heater to enhance the decomposition of the food wastes. This brings an energy conservation by application of a waste heat given off from the case of the deodorizing unit.

22 Claims, 9 Drawing Sheets

5,925,321

GARBAGE DISPOSING DEVICE

BACKGROUND OF THE INVENTION

1. Field of the Invention

The present invention relates to a garbage disposing device of an energy saving type which is capable of efficiently decomposing food wastes and deodorizing unpleasant odor of a gas resulting from the decomposition.

2. Disclosure of the Prior Art

In the past, garbage disposing devices for decomposing food wastes by a decomposer or a microbial transformation have been known. For example, a garbage disposing device 1C of the prior art is shown in FIG. 11. The disposing device 1C comprises a housing 10C, a vessel 20C for storing therein food wastes, and a decomposer for decomposing the food wastes placed in the vessel, and an ozone deodorizer unit 50C. The housing 10C has an air intake port 11C and an air discharge port 12C. The vessel 20C has an air inlet 21C and an air outlet 22C, and is incorporated in the housing 10C. Wood chips carrying thereon microbes are used as the decomposer. Numeral 90C designates an agitator for agitating a mixture of the decomposer and the food wastes in the vessel 20C. Numeral 3C designates a planar heater for heating the decomposer in the vessel 20C.

An intake passage 16C is formed in the housing 10C to extend from the air intake port 11C to the air inlet 21C for introducing a fresh air into the vessel 20C. A heater 52C is arranged in the intake passage 16C to warm the fresh air. The warmed fresh air is useful to activate the microbial transformation of the food wastes. In particular, when the garbage disposing device 1C is used outdoors in winter season, a cold air supplied from the outside into the vessel 20C lowers an efficiency of the microbial transformation of the food wastes. Therefore, it is necessary to warm the fresh air in the intake passage 16C before the fresh air is introduced into the vessel 20C. Numeral 9C designates a fan for sending the fresh air from the outside into the intake passage 16C. An exhaust passage 40C is formed in the housing 10C to extend from the air outlet 22C to the air discharge port 12C. Unpleasant odor in a gas resulting from the microbial transformation of the food wastes is deodorized by the ozone deodorizer unit 50C arranged in the exhaust passage 40C. Numeral 4C designates a fan for giving a forced flow of the air exhausted from the deodorizer unit 50C to the air discharge port 12C.

SUMMARY OF THE INVENTION

A primary object of the present invention is to provide a garbage disposing device of an energy saving type from the viewpoint of conservation of energy resources in recent years. That is, a garbage disposing device comprises a housing having an air intake port and an air discharge port, and a vessel mounted within the housing to store therein food wastes. The vessel has an air inlet and an air outlet. An intake passage is formed in the housing exteriorly of the vessel, and extends from the intake port to the air inlet for introducing a fresh air into the vessel. An exhaust passage is formed within the housing exteriorly of the vessel to extend from the air outlet to the discharge port for discharging therethrough an air containing unpleasant odor developed in the vessel due to a decomposition of the food wastes. The garbage disposing device comprises a deodorizer unit which is formed with a catalyst for decomposing the unpleasant odor, a heater for activating the catalyst, and a case for incorporating therein the catalyst and the heater. The garbage disposing device of the present invention is characterized in that the deodorizer unit is arranged in the exhaust passage such that an outer surface of the case is exposed in the intake passage, and the fresh air in the intake passage is warmed by a contact with the outer surface of the case inevitably heated by the heater. Therefore, it is possible to stably provide the warmed fresh air into the vessel to enhance the decomposition of the food wastes by application of a waste heat given off from the case of the deodorizing unit without arranging an additional heater in the intake passage. In addition, since it is not necessary to take a space for arranging the additional heater in the housing, there is an advantage of small-sizing the garbage disposing device.

In a preferred embodiment of the present invention, the intake passage is formed in a clearance between the vessel and the housing to extend from first and second air-intake ports formed in a bottom of the housing to the air inlet of the vessel, and the exhaust passage is located within the clearance to locate the deodorizer unit within the intake passage for heat transfer between the case heated by the heater and the fresh air being introduced through the intake passage. The garbage disposing device includes a control unit for controlling the heater. The control unit comprises electronic components carried on a board. The first air-intake port is located below the deodorizer unit to allow a part of the fresh air to pass by the case of the deodorizer unit. The second air-intake port is located below the control unit to allow a part of the fresh air to pass by the electronic components of the control unit. In this case, the fresh air being introduced into the vessel can be warmed more efficiently by application of a waste heat given off from the electric components in addition to the waste heat given off from the case of the deodorizer unit. According to the heat transfer between the electric components and the fresh air, it is possible to prevent an overheat of the electric components.

It is preferred that a blower is arranged in the exhaust passage upstream of the deodorizer unit to give a forced flow of the air from inside of the vessel to the discharge port through the deodorizer unit. In particular, it is preferred that a return path is provided to extend from the exhaust passage at a portion between the blower and the deodorizer unit into the vessel for returning a portion of the air being discharged through the exhaust passage into the vessel as a forced return flow. The return flow is mixed with the fresh air supplied into the vessel from the intake passage to generate a convection of the mixed air in the vessel. As a result, it is possible to avoid the occurrence of a situation that the fresh air supplied in the vessel is instantly exhausted from the vessel through the air outlet without most of the fresh air being effectively used for the decomposition of the food wastes.

It is also preferred that the heater is of a U-shaped configuration having a pair of legs, and fixed in the case of the deodorizer unit with an open top end of the U-shape oriented in an upstream direction of the exhaust passage. It is also preferred that a flow splitter is placed near the open top end of the heater in order to diverge the incoming air flow into sub-flows which pass by the legs of the heater, respectively. In this case, there is an advantage that the air containing unpleasant odor can be sufficiently heated by the U-shaped heater before reaching the catalyst.

It is further preferred that a dilution chamber is arranged in the exhaust passage downstream of the deodorizer unit. The dilution chamber is provided with a diluting fan which introduces a fresh air directly from outside of the housing for diluting an air emerging out of the deodorizer unit by the fresh air. In addition, it is preferred that the dilution chamber extends in a lengthwise direction crossing with a direction of the air flow emerging out of the deodorizer unit and is formed at opposite ends of the lengthwise direction respectively with the discharge port and an air hole introducing the fresh air into the dilution chamber. Moreover, it is preferred that a baffle is provided at conjuncture of the deodorizer unit and the dilution chamber for directing the air emerging out of the deodorizer unit towards the discharge port, and the diluting fan is placed between the baffle and the air hole for introducing the fresh air into the dilution chamber and merging it with the air emerging out of the deodorizer unit.

In another preferred embodiment of the preset invention, the heater is of a U-shaped configuration having an open top end and a closed bottom end, and fixed in the deodorizer unit with the open top end oriented upstream of the exhaust passage and with the closed bottom end directed to the catalyst. A blower is provided in the exhaust passage upstream of the U-shaped heater to give a forced flow of the air from inside of the vessel through the deodorizer unit. A first temperature sensor is provided adjacent the closed bottom of the U-shaped heater upstream of the catalyst to give a heater temperature, and a second temperature sensor is provided adjacent downstream of the catalyst to give a catalyst temperature. A control unit is provided to compare the catalyst temperature with the heater temperature for recognizing an abnormal condition when the catalyst temperature is lower than the heater temperature, At the abnormal condition, the control unit stops a supply of electric current to the U-shaped heater and the blower.

These and still other objects and advantages will become apparent from the following description of the preferred embodiments of the invention when taken in conjunction with the attached drawings.

DETAILED DESCRIPTION OF PREFERRED EMBODIMENTS

Figure 1:
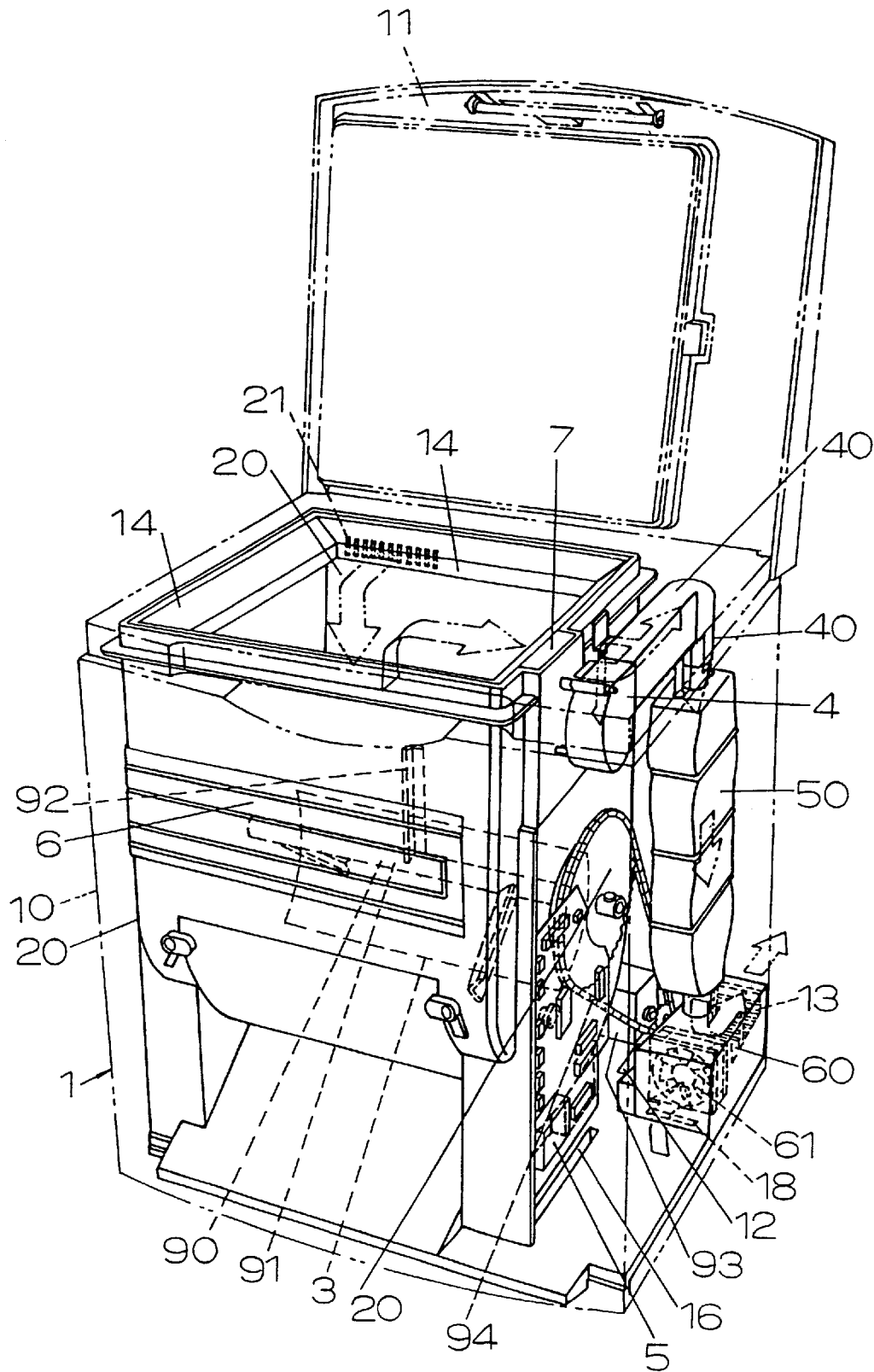
FIG. 1 is a perspective view of a garbage disposing device of the present invention.
Figure 2:
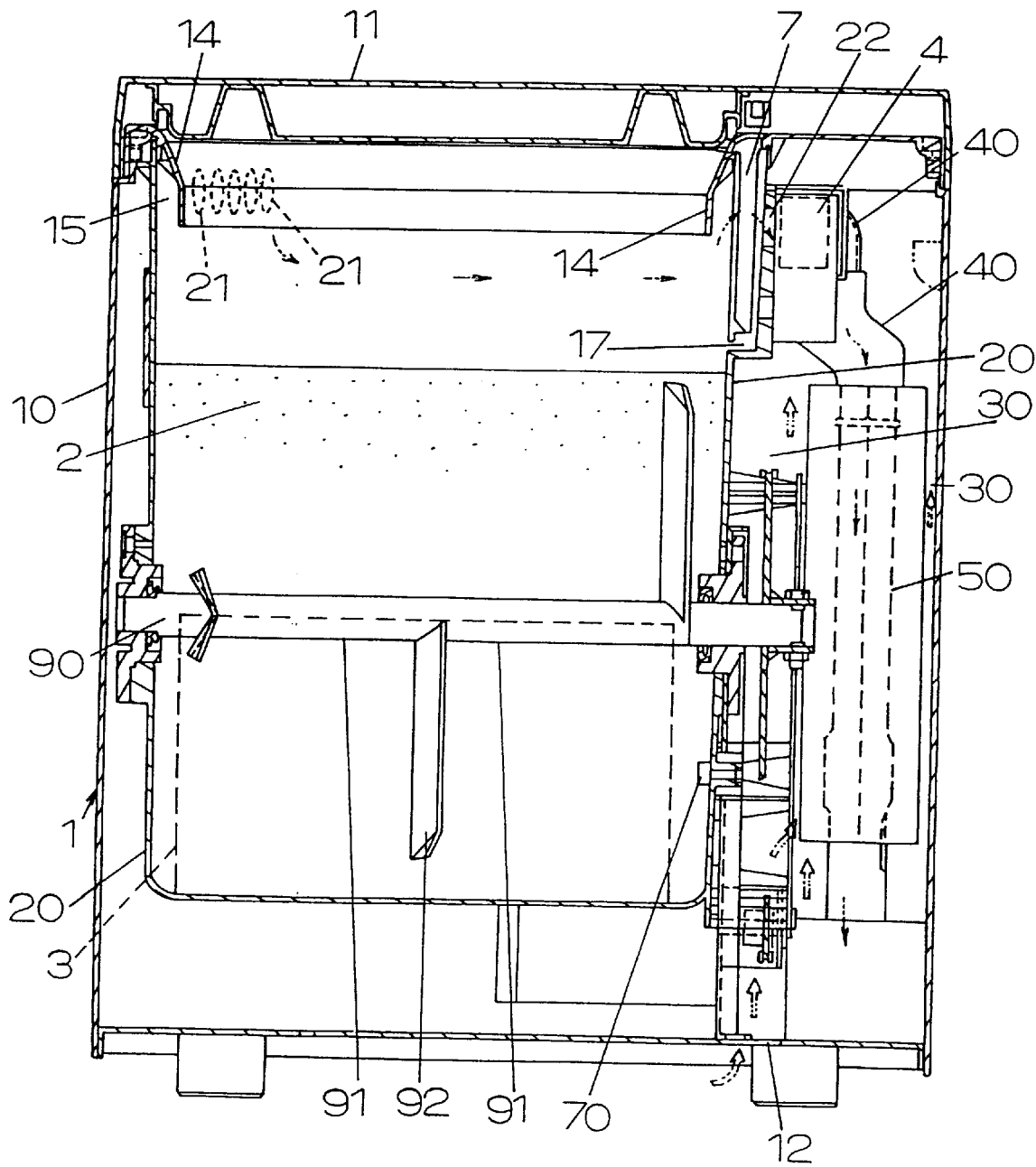
FIG. 2 is a cross section of the garbage disposing device.
Figure 3:
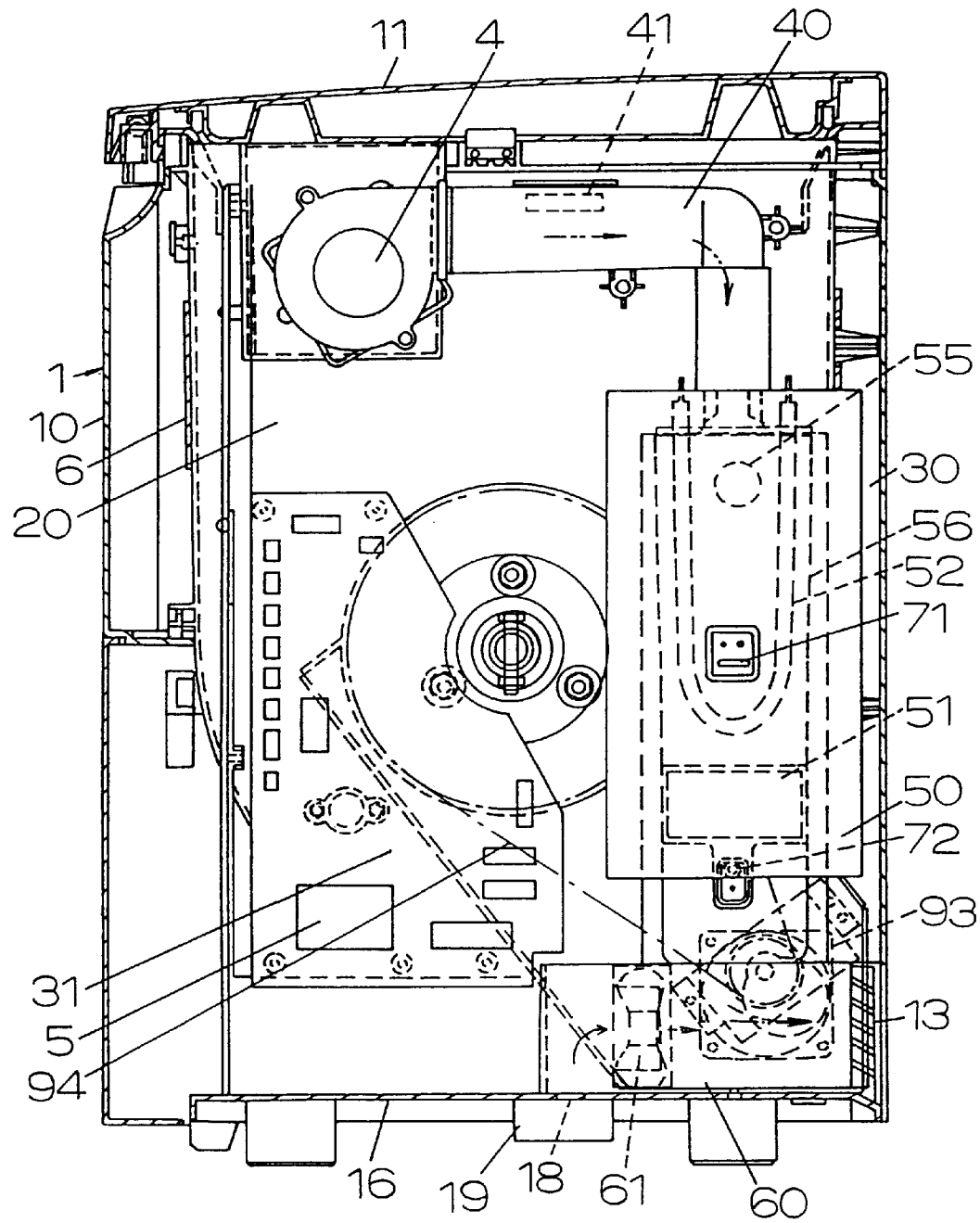
FIG. 3 is a cross section of the garbage disposing device.

As shown in FIGS. 1 to 3, a garbage disposing device 1 comprises a housing 10 having a lid 11, and a vessel 20 mounted within the housing to store therein food wastes. The housing 10 has an air intake port 12 and an air discharge port 13. The vessel 20 has an air inlet 21 and an air outlet 22. A decomposer 2 capable of providing a microbial transformation of the food wastes is placed in the vessel 20. The microbial transformation means that organic compounds contained in the food wastes are transformed by the help of microbe's enzymes. For example, a sawdust carrying thereon microbes may be used as the decomposer 2. In addition, a decomposer disclosed in Japanese Patent Publication [KOKOKU] No. 2-30760 can be used. An agitator 90 is arranged in the vessel 20 to uniformly mix the food wastes with the decomposer 2. The agitator 90 is formed with a horizontal shaft 91 rotatably supported about its axis to the housing 10, a plurality of agitating rods 92 projecting from the horizontal shaft, and a drive unit 93 for rotating the horizontal shaft through a chain 94. Numeral 3 designates a planar heater attached to an outer surface of the vessel 20 to heat the decomposer 2.

Figure 4:
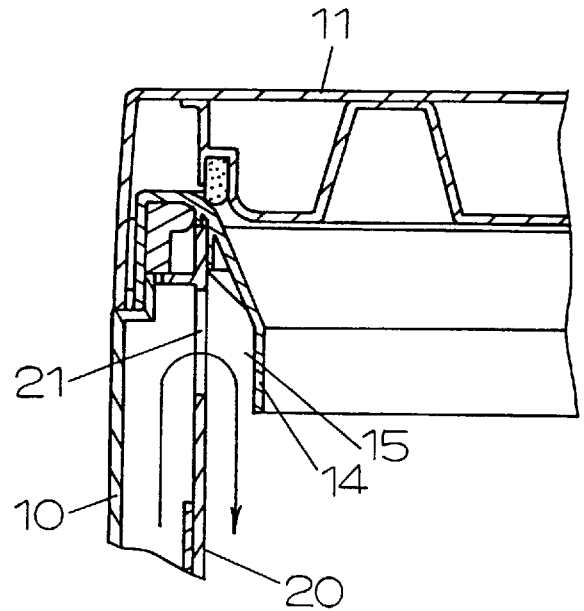
FIG. 4 is a cross section of an intake passage of the garbage disposing device.
Figure 8:
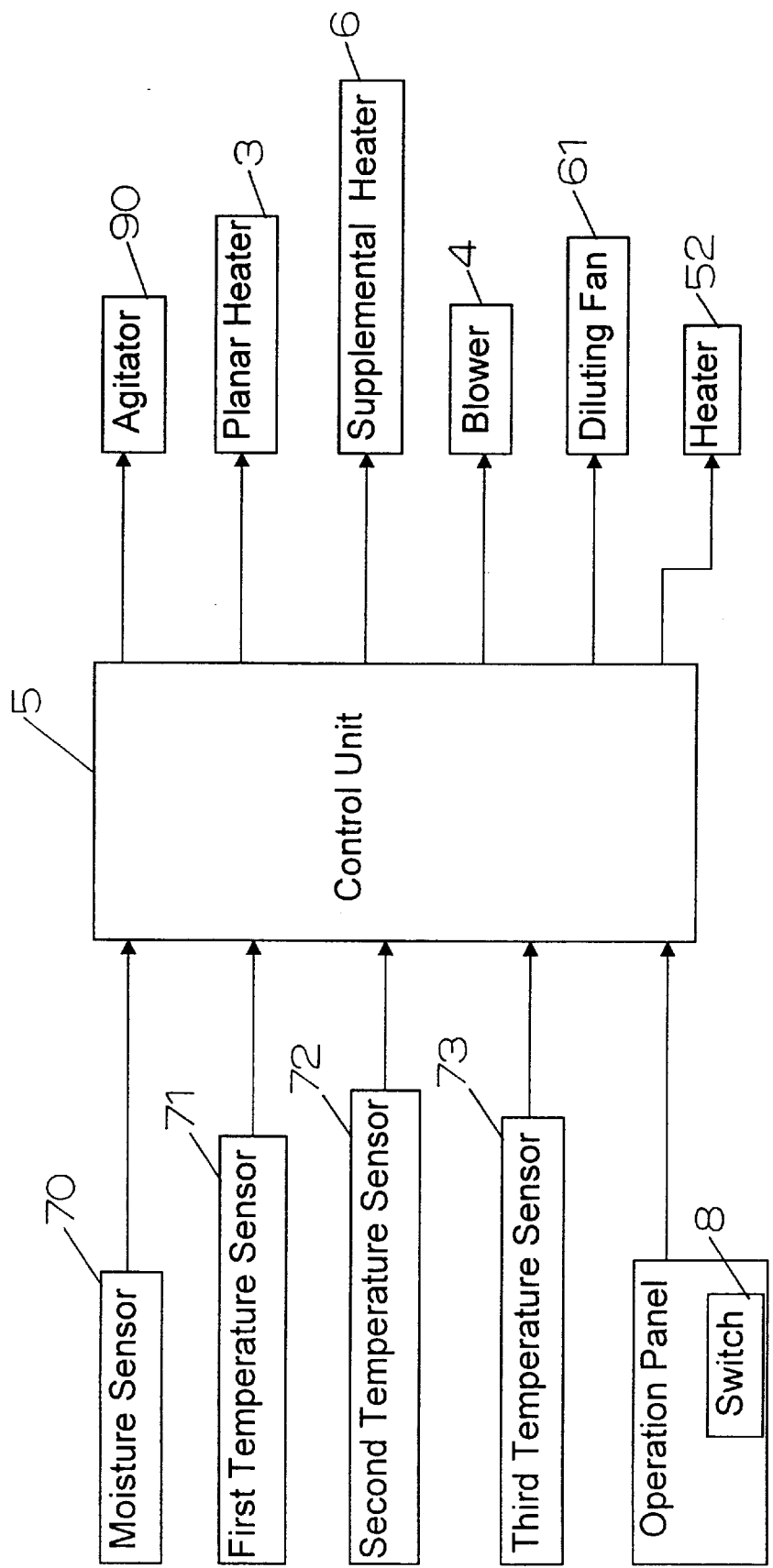
FIG. 8 is schematic diagram of a control unit of the garbage disposing device.

A moisture sensor 70 is attached to an inner surface of the vessel 20 to measure a moisture content of the decomposer 2. According to the moisture content, the planar heater 3, agitator 90, and a blower 4 explained below, can be controlled by a control unit 5, as shown in FIG. 8. Numeral 6 designates a supplemental heater arranged at an upper portion of a side wall of the vessel 20. The supplemental heater 6 is useful to prevent the occurrence of dew in the vessel 20 and enhance the microbial transformation of the food wastes. The air outlet 22 and the air inlet 21 are positioned behind a depending wall 14 of the housing 10 which extends along the circumference of a top opening of the vessel 20, as shown in FIG. 4. Therefore, a fresh air is introduced into the vessel 20 from the air inlet 21 through a clearance 15 between the depending wall 14 and the vessel, as shown by the arrow of FIG. 4. An air containing unpleasant odor resulting from the microbial transformation of the food wastes is exhausted from the air outlet 22 through the clearance 15, as shown in FIG. 2.

A main intake passage is formed within the housing 10 exteriorly of the vessel 20 to extend from the air intake port 12 to the air inlet 21 for introducing a fresh air into the vessel. An exhaust passage is formed in the housing 10 with a duct 40 extending from the air outlet 22 to the air discharge port 13 for discharging therethrough the air containing unpleasant odor. In this garbage disposing device 1, a clearance 30 formed between a side wall of the vessel 20 and the duct 40 of the exhaust passage and between a side wall of the housing 10 and the duct is defined as the intake passage, as shown in FIG. 2. A deodorizer unit 50 is mounted in the exhaust passage. The deodorizer unit 50 comprises a catalyst 51 for removing the unpleasant odor of the air to be discharged through the air discharge port 13, and a U-shaped heater 52 arranged at the upstream of the catalyst to heat the catalyst and the air containing the unpleasant odor. The catalyst 51 is formed with a honeycomb structure made of a ceramic material and platinum deposited on the honeycomb structure.

Figure 6:
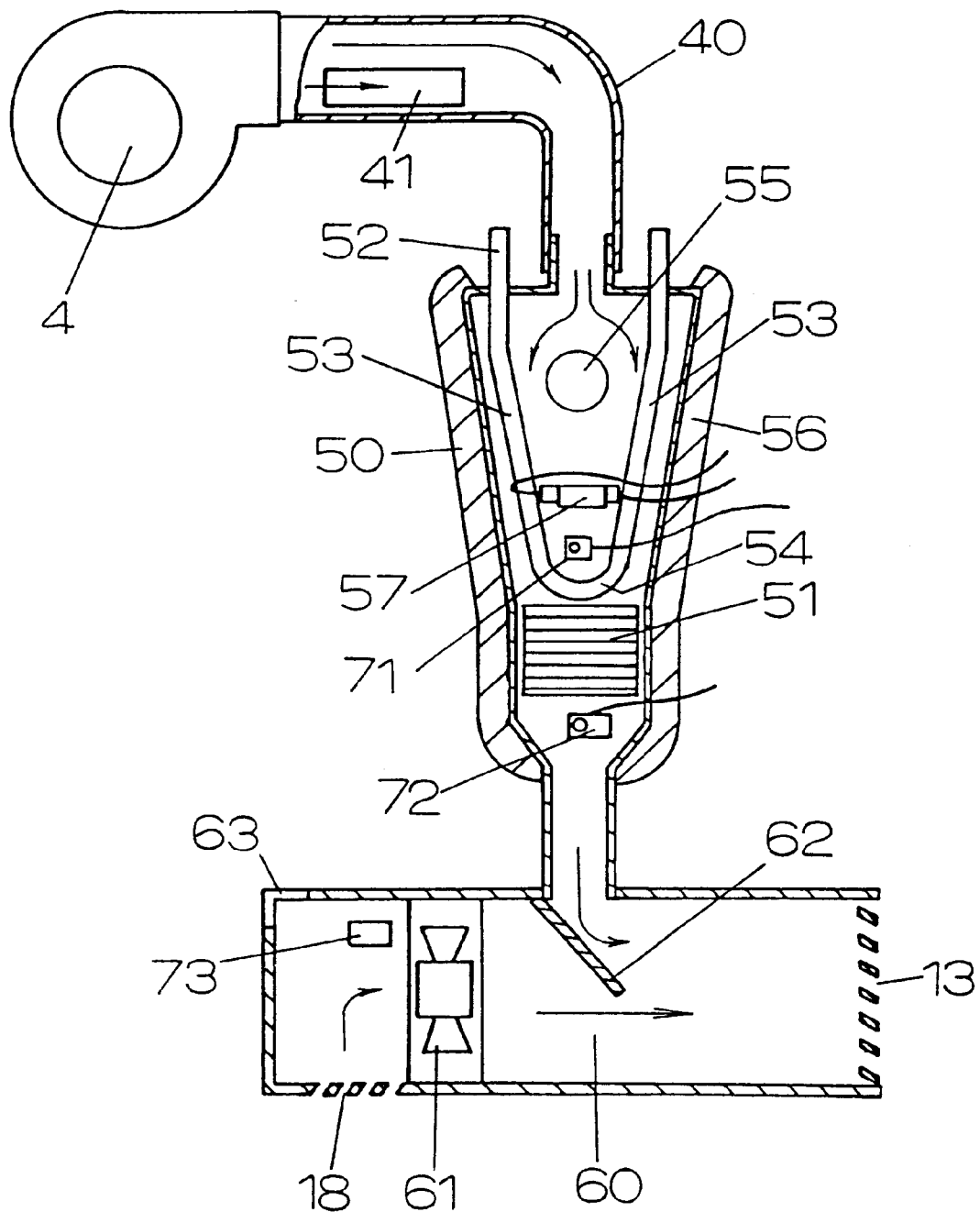
FIG. 6 is a cross section of an exhaust passage of the garbage disposing device.

The catalyst 51 and the U-shaped heater 52 are placed in a heater case 56 having top and bottom openings for allowing the air being discharged to pass through the U-shaped heater case. The U-shaped heater 52 has a pair of legs 53 and an arcuate portion 54 therebetween, and fixed in the heater case 56 with an open top end of the U-shape configuration oriented in an upstream direction of the exhaust passage, and with the arcuate portion 54 directed to the catalyst 51, as shown in FIG. 6. Numeral 55 designates a flow splitter placed near the open top end of the U-shaped heater 52 in order to diverge the incoming air flow into sub-flows which pass by the legs 53 of the U-shaped heater, respectively. The sub flows diverged by the flow splitter 55 are uniformly heated by the legs 53 of the U-shaped heater 52. The heater case 56 is disposed such that an outer surface of the heater case is exposed in the intake passage, and the fresh air in the intake passage is warmed by a contact with the outer surface of the heater case inevitably heated by the U-shaped heater 52. In other words, the outer surface of the heater case 56 exposed in the intake passage effects as a waste-heat recover section. Alternatively, the intake passage may be formed by an intake duct extending from the air intake port 12 to the air inlet 21 such that an outer surface of the heater case 56 is exposed in the intake duct.

The control unit 5 carries thereon electric components for controlling the U-shaped heater 52. An additional air-intake port 16 is formed in the bottom of the housing 10. A clearance 31 formed between the electric components and a side wall of the housing is defined as a supplemental intake passage. A fresh air introduced in the supplemental intake passage is exposed to the electric components, and warmed by a waste heat resulting from the electric components during an operation of the garbage disposing device 1. The warmed fresh air in the supplemental intake passage is joined with the fresh air flowing in the main intake passage, and then introduced into the vessel 20. Since the electric components are air-cooled by the air flow in the supplemental intake passage, it is possible to prevent an overheat of the control unit 5.

The blower 4 is arranged at the upstream of the deodorizer unit 50 in the duct 40 of the exhaust passage to give a forced flow of the air containing unpleasant odor to the deodorizer unit 50. The blower 4 is controlled to have a discharge rate within a range of 20 to 100 liter/min. For example, when the discharge rate is 20 liter/min, the blower 4 is capable of removing the moisture at a rate of about 800 to 900 g/day. Numeral 7 designates a filter for preventing an intrusion of the decomposer 2 into the duct 40. Numeral 17 designates an opening for returning the decomposer caught by the filter to the vessel 20.

A return path 41 is provided to extend from the duct 40 of the exhaust passage at a portion between the blower 4 and the deodorizer unit 50 into the vessel 20 for returning a part of the air being discharged through the exhaust passage into the vessel as a forced return flow. The air flowing into the vessel 20 through the return path 41 is mixed with the fresh air introduced into the vessel 20 through the air inlet 21 to generate a convection of the mixed air in the vessel. The return path 41 is useful to avoid a situation that the fresh air introduced in the vessel 20 is instantly exhausted from the air outlet 22 without being effectively used for the microbial transformation of the food wastes.

Figure 7:
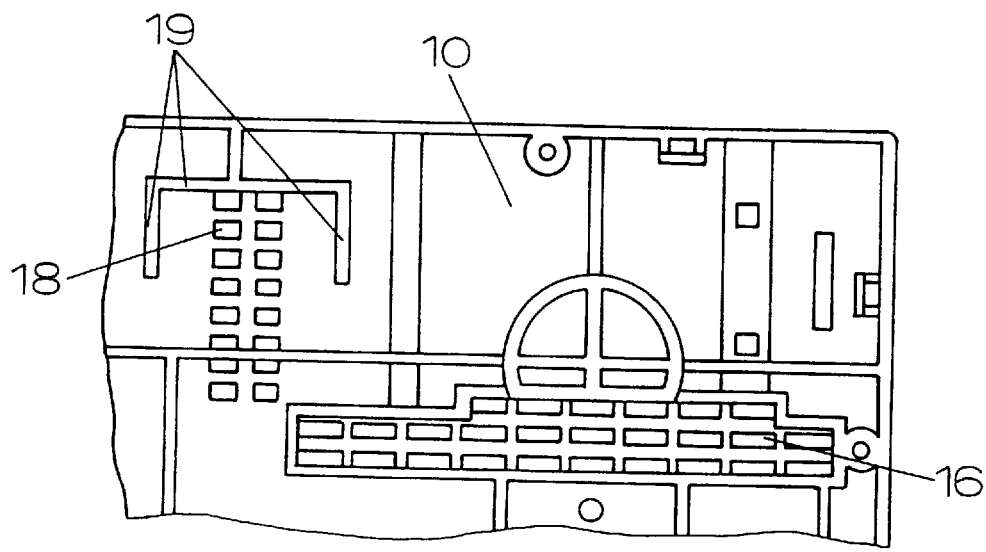
FIG. 7 is a partially bottom view of the garbage disposing device.

The garbage disposing device 1 has a diluting duct 60 extending from a second-air intake port 18 formed in the bottom of the housing 10, as shown in FIG. 7, to the air discharge port 13. A diluting fan 61 is disposed in the diluting duct 60 to introduce a fresh air directly from outside of the housing 10 through the second air-intake port 18 for diluting the air emerging out of the deodorizer unit 50 by the fresh air. The duct 40 of the exhaust passage is joined with the diluting duct 60, at the downstream of the deodorizer unit 50 and between the diluting fan 61 and the air discharge port 13. For example, when a hot air of 250° C. emerging out of the deodorizer unit 50 flows into the diluting duct 60 at a discharge rate of 20 liter/min of the blower 4, and a fresh air of 30° C. is introduced into the diluting duct at a rate of 200 liter/min by the diluting fan 61, it has been confirmed that the hot air of 250° C. is mixed with the fresh air of 30° C., and a mixed air of about 50° C. is discharged through the discharge port 13 at a discharge rate of 220 liter/min. Thus, it is preferred that the diluting fan 61 and the blower 4 are controlled by the control unit 5 such that an amount of the air flow produced by the diluting fan is greater than that of the air flow produced by the blower. In FIG. 7, numeral 19 designates a waterproof wall formed on the bottom surface of the housing 10 to prevent the intrusion of water, e.g., rain water, into the diluting duct 60 through the second air-intake port 18.

Figure 5C:
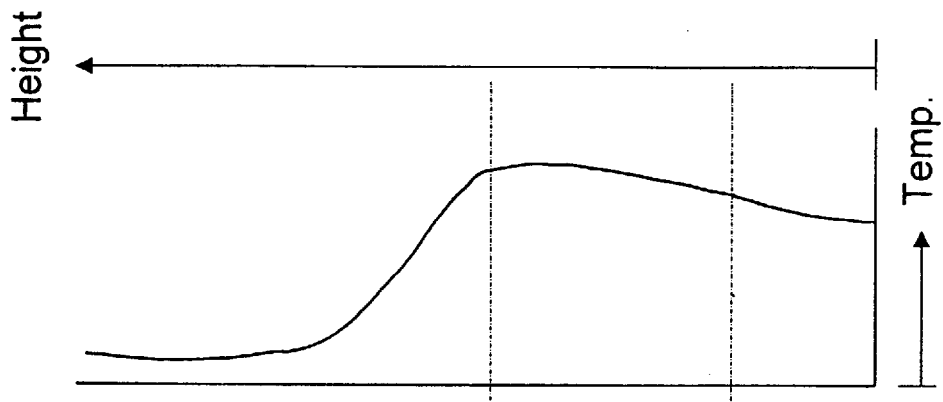
FIG. 5C is a temperature curve at an abnormal condition of the deodorizer unit.
Figure 5B:
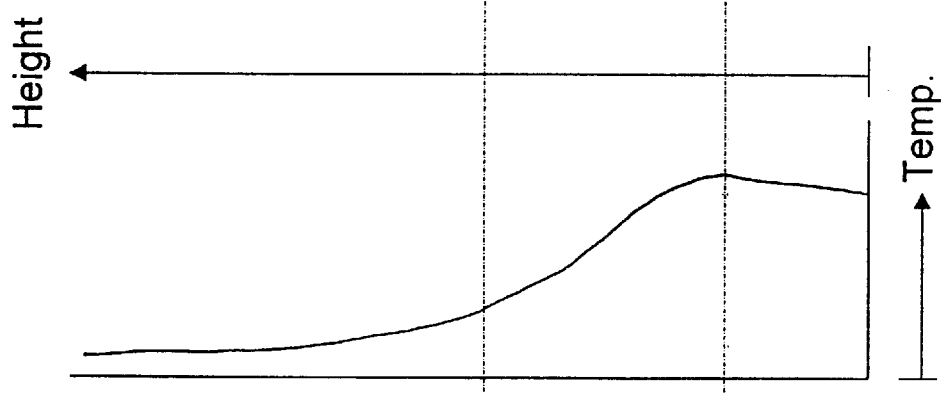
FIG. 5B is a temperature curve at a normal condition of the deodorizer unit.
Figure 5A:
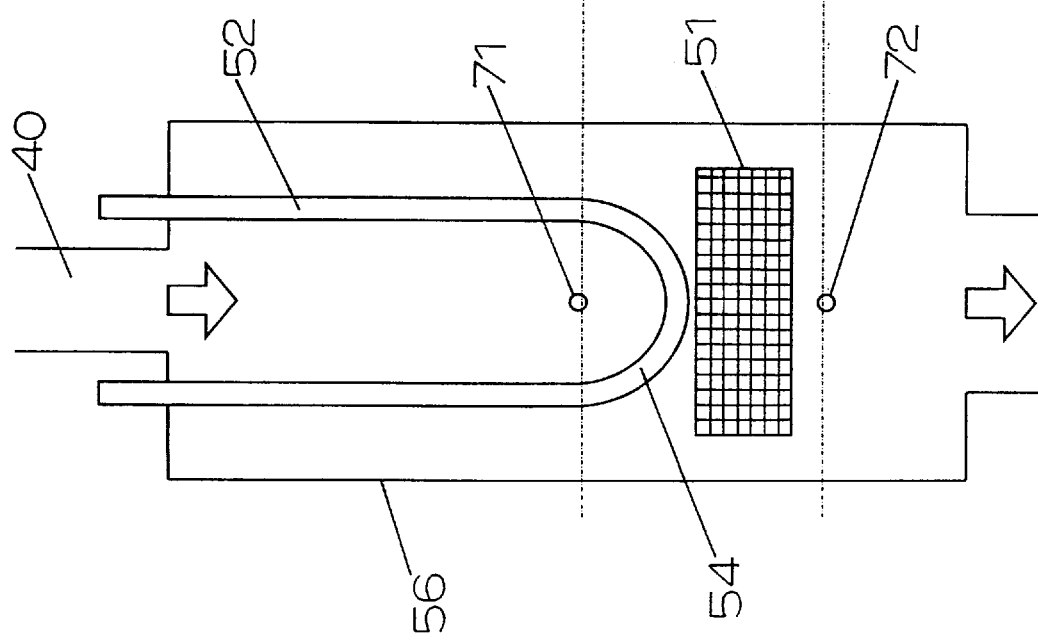
FIG. 5A is a cross-sectional view of a deodorizer unit of the garbage disposing device.

A first temperature sensor 71 is disposed at the inside of the arcuate portion 54 of the U-shaped heater 52, as shown in FIG. 5A, to measure a temperature of the U-shaped heater. A supply of electric current to the U-shaped heater 52 is controlled by the control unit 5 according to a temperature value measured by the first temperature sensor 71. A second temperature sensor 72 is disposed adjacent the catalyst 51 in the deodorizer unit 50 to measure a temperature of the catalyst. The catalyst temperature measured by the second temperature sensor 72 is compared with the heater temperature measured by the first temperature sensor 71 at the control unit 5. When the catalyst temperature is higher than the heater temperature, as shown in FIG. 5B, it is regarded as a normal condition of the deodorizer unit 50. On the other hand, when the heater temperature is higher than the catalyst temperature due to an accident such as a clogging of the filter 7, as shown in FIG. 5C, it is regarded as an abnormal condition of the deodorizer unit 50. At the abnormal condition, the control unit 5 responds to stop the supply of electric current to the U-shaped heater 52 and the blower 4. Numeral 57 designates a temperature fuse responding to an abnormal condition of the U-shaped heater 52. For example, the temperature fuse 57 will operate at a temperature of 390° C.

A third temperature sensor 73 is arranged at the upstream of the diluting fan 61 in the diluting duct 60 to measure a temperature of the outside air. When a temperature value measured by the third temperature 73 is lower than a predetermined temperature value, the supplemental heater 6 may be turned on, or a supply of electric current to the supplemental heater is increased. Alternatively, the discharge rate of the blower 4 may be reduced when the temperature of the outside air is low. On the other hand, when the temperature value measured by the third temperature sensor 73 is higher than a predetermined temperature value, it is assumed that the diluting fan 61 stops for some reason, or the air discharge port 13 is closed for some reason. In this case, the control unit 5 stops the supply of electric current to the U-shaped heater 52, the blower 4 and the diluting fan 61 to provide a safe operation of the garbage disposing device 1.

In FIG. 6, numeral 62 designates a baffle provided at conjuncture of the duct 40 of the exhaust passage and the diluting duct 60 for directing the air emerging out of the deodorizer unit 50 towards the air discharge port 13. Numeral 63 designates an air vent formed in the diluting duct 60 adjacent to the third temperature sensor 73 and between the second air-intake port 18 and the diluting fan 61. For example, when the diluting fan 61 stops for some reason, there is a possibility of causing a back flow of the discharge gas in the diluting duct 60. In this case, a portion of the back flow will be exhausted from the air vent 63 after passing by the third temperature sensor 73. Therefore, a high temperature of the back flow can be detected by the third temperature sensor 73. According to an output of the third temperature sensor 73 informing the unusual state in the diluting duct 60, the supply of electric current to the U-shaped heater 52 is stopped by the control unit 5.

The garbage disposing device 1 has a switch 8 for selectively operating the device at a low deodorizing mode and a high deodorizing mode. At the low deodorizing mode, the U-shaped heater 52 is heated at a first temperature, e.g., 150° C. In case of using platinum as the catalyst 51, about 90% of sulfur and about 30% of ammonia in the air containing unpleasant odor being discharged from the vessel 20 can be removed by the heated catalyst 51 at the low deodorizing mode. At the high deodorizing mode, the U-shaped heater 52 is heated at a second temperature higher than the first temperature, e.g., 250° C. About 90% of sulfur and about 90% of ammonia in the air containing unpleasant odor can be removed by the heated catalyst 51 at the high deodorizing mode. When the high deodorizing mode is adopted, it is preferred that the high deodorizing mode is automatically turned off after the elapse of a predetermined time period, e.g., 48 hours. If necessary, an ammonia content in the gas being exhausted from the vessel 20 may be detected by an ammonia sensor (not shown), and the low and high deodorizing modes may be automatically switched according to the ammonia content.

The blower 4 can be controlled by the control unit 5 according to the following manner. When the catalyst temperature measured by the second temperature sensor 72 is smaller than a predetermined temperature, the blower 4 is controlled to increase a discharge rate for a constant time period. When the catalyst temperature measured by the second temperature sensor 72 does not reach the predetermined temperature within the time period, the supply of electric current to the U-shaped heater 52 and the blower 4 is stopped by the control unit 5. For example, when the discharge port 13 is accidentally closed by an obstacle such as a leaves, there is a possibility that a mixture gas of the fresh air introduced by the diluting fan 61 and the gas emerging out of the deodorizer unit 50 flows backward in the duct 40 of the exhaust passage to reduce the catalyst temperature. In such a case, an amount of air flow produced by the blower 4 is increased for the time period to blow off the leaves. However, if the obstacle is not removed by the increased air flow within the time period, the supply of electric current to the U-shaped heater 52 and the blower 4 is stopped for a safe operation of the garbage disposing device 1. Alternatively, the supply of electric current to the U-shaped heater 52 and the blower 4 may be stopped immediately when the catalyst temperature detected by the second temperature sensor 72 is smaller than a predetermined temperature. The control unit 5 operates not to respond to the detected temperature until after an elapse of a predetermined time from the start of the garbage disposing device 1.

In addition, it is preferred that the control unit 5 samples the catalyst temperature detected by the second temperature sensor 72 at an interval of several minutes and determines an abnormal condition to stop operating the U-shaped heater 52, the blower 4, and the diluting fan 61, only when all of some successively detected temperatures, e.g., five successively detected temperatures, are smaller than a predetermined temperature. Therefore, even when two or three successively detected temperatures are smaller than the predetermined temperature due to the influence of a gust of wind, the control unit 5 will not regard the situation as the abnormal condition. It is also preferred that when the catalyst temperature detected by the second temperature sensor 72 is lower than a predetermined temperature, e.g., 100° C., even after the elapse of a prescribed time duration, e.g., 10 minutes, from the start of the garbage disposing device 1, the control unit 5 stops the supply of electric current to the U-shaped heater 52.

In general, there is a difference between temperatures of the outside air detected at daily night and noon. According to this temperature difference, it is possible to self-check whether the third temperature sensor 73 is normally operating. That is, the control unit 5 obtains a digital value converted from an analog value of the temperature detected at each of daily night and noon by the third temperature sensor 73. The control unit 5 provides a difference between two successively obtained digital values. When the difference is equal to or greater than a predetermined value, the control unit 5 regards that the third temperature sensor 73 normally operates. However, when the difference is less than the predetermined value, the control unit 5 determines that the third temperature sensor 73 is in an unusual state, and stops the supplies of electric current to the U-shaped heater 52, the blower 4, and the diluting fan 61. Thus, the selfdiagnosis of determining a failure of the third temperature sensor 73 will promise a safe operation of the garbage disposing device 1.

The U-shaped heater 52 can be controlled by the control unit 5 such that the supply of electric current to the U-shaped heater is stopped when a temperature value except for a predetermined temperature range is detected by at least one of the first and second temperature sensors (71 and 72). In addition, it is preferred that the supply of electric current to the U-shaped heater 52 is stopped by the control unit 5 when a duty ratio is not within a predetermined range. For example, when an amount of air flow produced by the blower 4 is reduced as a result of an accident such as a clogging of the filter 7, the temperature value detected by the first or second temperature sensor (71 or 72) comes to be higher, so that the duty ratio, i.e., a supply rate of electric current, will be less than a lower limit of the predetermined range. Since such a low duty ratio is regarded as unusual, the supply of electric current to the U-shaped heater 52 is stopped by the control unit 5. On the other hand, when the amount of air flow produced by the blower 4 is increased as a result of an accident such as a back flow of the discharge gas or a failure of the blower, the temperature value detected by the first or second temperature sensor (71 or 72) comes to be lower, so that the duty ratio will be higher than an upper limit of the predetermined range. Since such a high duty ratio is regarded as unusual, the supply of electric current to the U-shaped heater 52 is stopped by the control unit 5.

Figure 9:
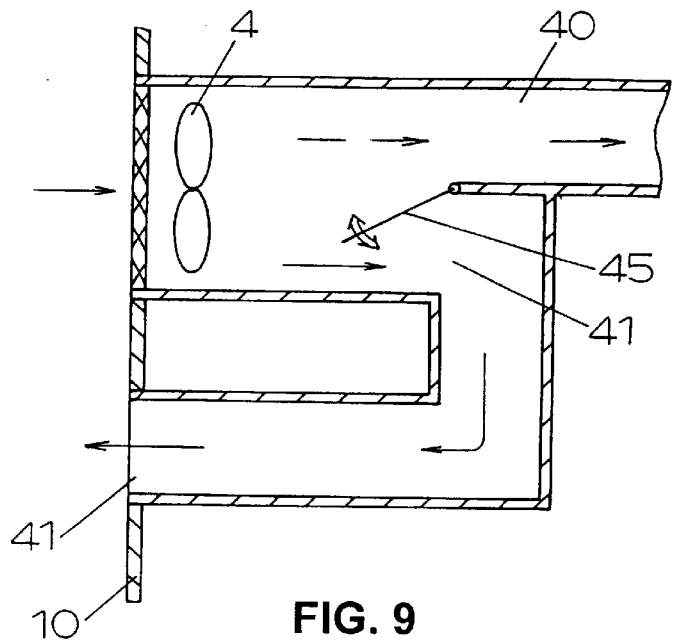
FIG. 9 is a cross-sectional view of a return path of the garbage disposing device.

If necessary, a flow regulator 45 may be mounted at conjuncture of the duct 40 of the exhaust passage and the return path 41, as shown in FIG. 9. The flow regulator 45 is biased by a spring (not shown). When an amount of air flow produced by the blower 4 is decreased, the flow regulator 45 is moved by the spring such that an amount of air flow introduced into the return path 41 is kept constant. On the contrary, when the amount of air flow produced by the blower 4 is increased, the flow regulator 45 is moved against the spring bias by the air flow so that the amount of air flow introduced into the return path 41 is kept constant.

Figure 10:
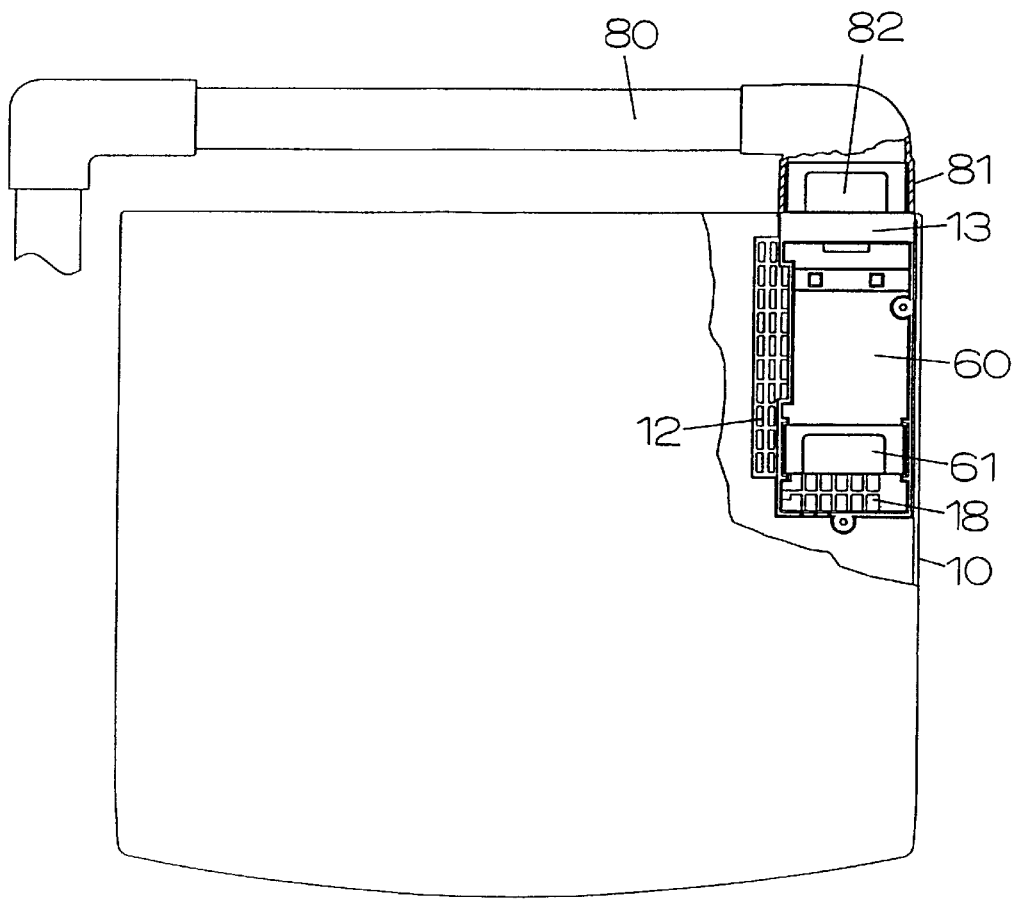
FIG. 10 is a partially cross-sectional view showing an exhaust extension tube connected to a diluting duct of the garbage disposing device.
Figure 11:
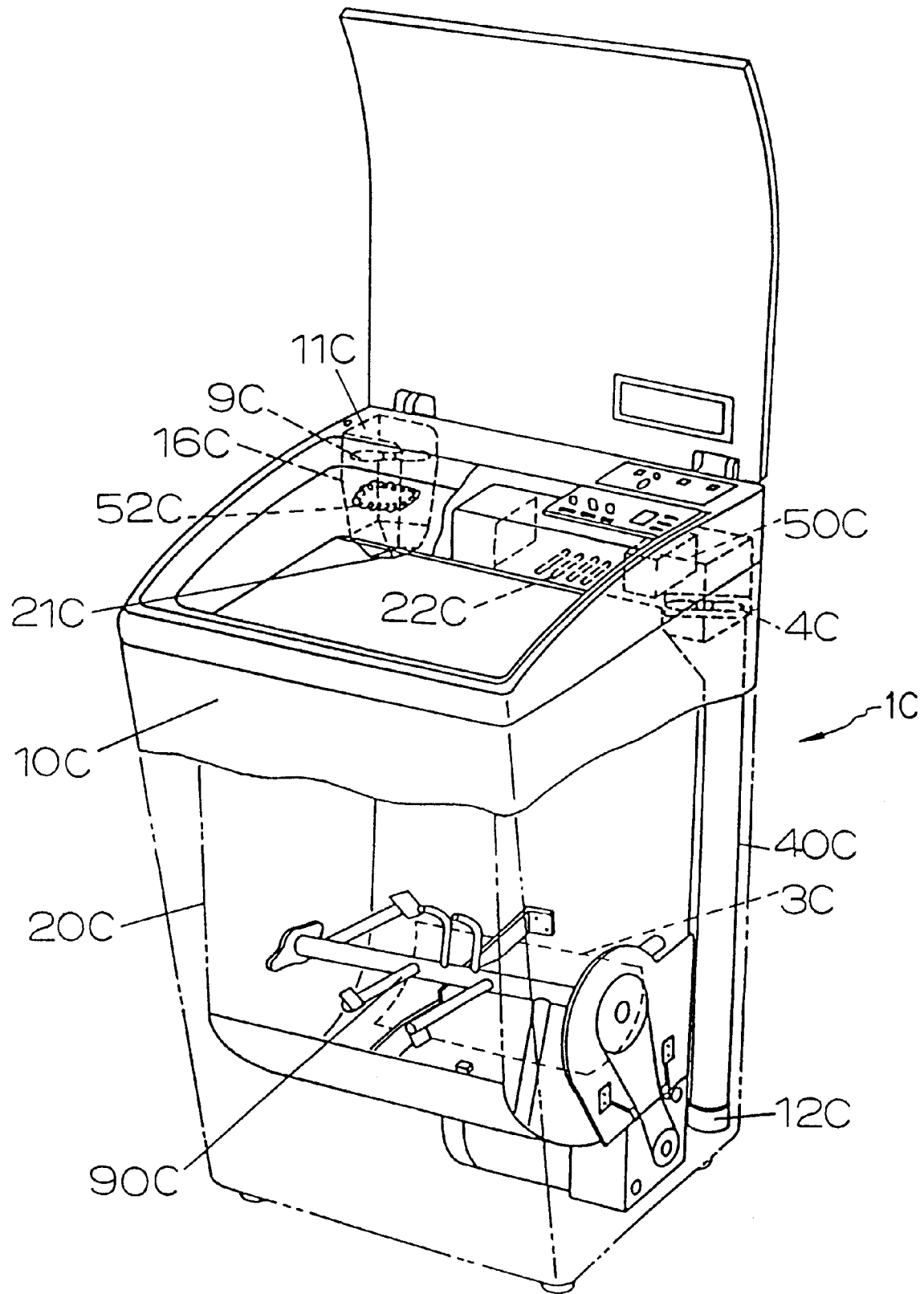
FIG. 11 is a perspective view of a garbage disposing device of the prior art.

An extension exhaust tube 80 may be detachably connected to the discharge port 13 through an adapter 81, as shown in FIG. 10. It is preferred that an additional blower 82 is arranged in the adapter 81 to prevent the occurrence of a back flow of the discharge gas. By the use of the exhaust tube 80, the garbage disposing device 1 may be placed and used in a house.

What is claimed is:

1. A garbage disposing device which comprises:
    a housing having an air intake port and an air discharge port;

a vessel mounted within said housing to store therein food wastes, said vessel having an air inlet and an air outlet;

an intake passage formed in said housing exteriorly of said vessel and extending from said intake port to said air inlet for introducing a fresh air into said vessel;

an exhaust passage formed within said housing exteriorly of said vessel to extend from said air outlet to said discharge port of said housing for discharging therethrough an air containing unpleasant odor developed in said vessel due to a decomposition of said food wastes;

a deodorizer unit comprising a catalyst which decomposes said unpleasant odor contained in the air being discharged, a heater for activating said catalyst, and a case for incorporating therein said catalyst and said heater;

wherein said deodorizer unit is arranged in said exhaust passage such that an outer surface of said case is exposed in said intake passage, and the fresh air in said intake passage is warmed by a contact with the outer surface of said case inevitably heated by said heater to enhance the decomposition of said food wastes.

2. The garbage disposing device as set forth in claim 1, wherein said intake passage is formed in a clearance between said vessel and said housing to extend from first and second air-intake ports formed in a bottom of said housing to said air inlet, and wherein said exhaust passage is located within said clearance to locate said deodorizer unit within said intake passage for heat transfer between said case heated by said heater and the fresh air being introduced through said intake passage, said device including a control unit for controlling said heater, said control unit comprising electronic components carried on a board, said first air-intake port being located below said deodorizer unit to allow a part of the fresh air being introduced to pass by said case of said deodorizer unit, said second air-intake port located below said control unit to allow a part of the fresh air to pass by said electronic components of said control unit.

3. The garbage disposing apparatus as set forth in claim 1, wherein said vessel is provided at its upper portion with an auxiliary heater for heating the air inside of said vessel.

4. The garbage disposing device as set forth in claim 1, further including a blower arranged in said exhaust passage upstream of said deodorizer unit to give a forced flow of the air from inside of said vessel through said deodorizer unit.

5. The garbage disposing device as set forth in claim 4, wherein a return path is provided to extend from said exhaust passage at a portion between said blower and said deodorizer unit into said vessel for returning a portion of the air being discharged through said exhaust passage into said vessel as a forced return flow.

6. The garbage disposing device as set forth in claim 1, wherein said heater is of a U-shaped configuration having a pair of legs and is fixed in said deodorizer unit with an open top end of the U-shape oriented in an upstream direction of said exhaust passage, a flow splitter means being placed near said open top end of said heater in order to diverge the incoming air flow into sub-flows which pass by said legs of said heater, respectively.

7. The garbage disposing device as set forth in claim 1, further including a switch for selectively operating said device at a high deodorizing mode and a low deodorizing mode such that the unpleasant odor contained in the air being discharged is more completely decomposed when the garbage disposing device is operating in the high deodorizing mode than when the garbage disposing device is operating in the low deodorizing mode.

8. The garbage disposing device as set forth in claim 7, wherein said heater is controlled to heat said catalyst to a higher temperature when the garbage disposing device is operating in said high deodorizing mode than said catalyst is heated when said garbage disposing device is operating in said low deodorizing mode, a temperature sensor being provided near said catalyst to control said heater.

9. The garbage disposing device as set forth in claim 4, further including a dilution chamber arranged in said exhaust passage downstream of said deodorizer unit, said dilution chamber provided with a diluting fan which introduces a fresh air directly from outside of the housing for diluting the air emerging out of said deodorizer unit by the fresh air.

10. The garbage disposing device as set forth in claim 9, wherein said dilution chamber is provided with a temperature sensor upstream of said diluting fan to give a temperature of the fresh air being introduced in said dilution chamber.

11. The garbage disposing device as set forth in claim 9, wherein said dilution chamber extends in a lengthwise direction crossing with a direction of the air flow emerging out of said deodorizer unit and is formed at opposite ends of said lengthwise direction respectively with said discharge port and an air hole introducing the fresh air into said dilution chamber, a baffle being provided at conjuncture of said deodorizer unit and said dilution chamber for directing the air emerging out of said deodorizer unit towards said discharge port, said diluting fan being placed between said baffle and said air hole for introducing the fresh air into said dilution chamber and merging it with said air emerging out of said deodorizer unit.

12. The garbage disposing device as set forth in claim 10, wherein said dilution chamber is provided with an additional air hole opposite of said discharge port and adjacent to said temperature sensor fixed between said diluting fan and said air hole.

13. The garbage disposing device as set forth in claim 1, further including an extension exhaust tube connected to and extending from said discharge port, said extension exhaust tube incorporating an additional blower for discharging the air out therethrough.

14. The garbage disposing device as set forth in claim 1, wherein a temperature sensor is provided adjacent to said catalyst of said deodorizing unit to give a detected temperature of said catalyst, and a control unit being provided for controlling to stop operating said heater when the detected temperature does not reaches a predetermined temperature within a prescribed time duration from the start of said device.

15. The garbage disposing device as set forth in claim 14, wherein said control unit operates to vary a duty ratio of electric current being fed to said heater for controlling the temperature of said catalyst in response to said detected temperature, said control unit stopping to operate said heater when said duty ratio goes beyond a predetermined range.

16. The garbage disposing device as set forth in claim 9, wherein a control unit is provided to give an amount of the air flow produced by said diluting fan greater than that of the air flow produced by said blower.

17. The garbage disposing device as set forth in claim 16, wherein a temperature sensor is provided adjacent to said catalyst of said deodorizing unit to give a detected temperature of said catalyst, and a control unit being provided to increase the amount of the air flow produced by said blower for a prescribed time duration when the detected temperature is less than a predetermined temperature, and stop operating said heater when the detected temperature does not reach the predetermined temperature within said prescribed time duration.

18. The garbage disposing device as set forth in claim 14, wherein said control unit operates not to respond to the detected temperature until after an elapse of a predetermined time from the start of said device.

19. The garbage disposing device as set forth in claim 17, wherein said control unit samples the detected temperature at an interval of several minutes and determines an abnormal condition to stop operating said heater, said blower, and said diluting fan only when all of some successively detected temperatures do not exceed a predetermined temperature.

20. The garbage disposing device as set forth in claim 10, further including a control unit which obtains a digital value converted from an analog value of the temperature detected at said temperature sensor at each of daily night and noon as indicative of the temperature of the outside air, said control units giving a difference between two successively obtained digital values and making a self-diagnosis of determining a failure of said temperature sensor to stop operating said heater, said blower, and said diluting fan when said difference is less than a predetermined value.

21. The garbage disposing device as set forth in claim 1, wherein said heater being of a U-shaped configuration having an open top end and a closed bottom end and fixed in said deodorizer unit with said open top end oriented upstream of said exhaust passage and with said closed bottom end directed to said catalyst, a blower being provided in said exhaust passage upstream of said deodorizer unit to give a forced flow of the air from inside of said vessel through said deodorizer unit, a first temperature sensor provided adjacent said closed bottom of said heater upstream of said catalyst to give a heater temperature, a second temperature sensor being provided adjacent downstream of said catalyst to give a catalyst temperature, a control unit being provided to compare said catalyst temperature with said heater temperature for recognizing an abnormal condition when said catalyst temperature is lower than said heater temperature, said control unit responding to said abnormal condition for stopping said heater and said blower.

22. The garbage disposing device as set forth in claim 1, wherein a decomposer capable of providing a microbial transformation of said food wastes is placed in said vessel.

* * * * *